US012590683B2

(12) United States Patent
Zhu et al.

(10) Patent No.: US 12,590,683 B2
(45) Date of Patent: Mar. 31, 2026

(54) SIMULATED FLAME LAMP

(71) Applicant: Shenzhen Xinliang Culture Development Co., Ltd., Shenzhen (CN)

(72) Inventors: Hongliang Zhu, Shenzhen (CN); Xiaoliang Zhu, Shenzhen (CN)

(73) Assignee: Shenzhen Xinliang Culture Development Co., Ltd., Shenzhen (CN)

( * ) Notice: Subject to any disclaimer, the term of this patent is extended or adjusted under 35 U.S.C. 154(b) by 0 days.

(21) Appl. No.: 19/181,388

(22) Filed: Apr. 17, 2025

(65) Prior Publication Data

US 2025/0243981 A1 Jul. 31, 2025

(30) Foreign Application Priority Data

Apr. 23, 2024 (CN) ......................... 202420853268.9

(51) Int. Cl.
*F21S 10/04* (2006.01)
*F21V 19/00* (2006.01)

(52) U.S. Cl.
CPC .......... *F21S 10/046* (2013.01); *F21V 19/003* (2013.01)

(58) Field of Classification Search
CPC ............................ F21V 19/003; F21S 10/046
See application file for complete search history.

(56) References Cited

U.S. PATENT DOCUMENTS 10,731,811 B1 * 8/2020 Wu ........................ F21S 10/046
12,222,076 B1 * 2/2025 She ........................... F21K 9/65
2016/0298816 A1 * 10/2016 Fang .......................... F21K 2/00
2019/0003686 A1 * 1/2019 Dong ....................... F21S 6/001
2020/0217469 A1 * 7/2020 Fan ........................ F21S 10/046

FOREIGN PATENT DOCUMENTS

CN 112762366 A 5/2021
CN 216667548 U 6/2022
DE 202015106532 U1 * 12/2015 ............ F21S 10/046

OTHER PUBLICATIONS

Innovation Q+ NPL Search (Year: 2025).*

* cited by examiner

*Primary Examiner* — Anabel Ton

(57) ABSTRACT

A simulated flame lamp includes a first lamp head, a second lamp head, a flame piece and a driving mechanism. One of the first lamp head and the second lamp head is provided with a support rod integrally extended inwardly, the first lamp head and the second lamp head are assembled to form a receiving cavity with an upper opening, a middle side of the flame piece is provided with a supported hole, and the support rod is inserted through the supported hole so that the flame piece is supported on a support portion of the support rod, with an upper end of the flame piece extending outside the upper opening. The driving mechanism is located inside the receiving cavity and configured to drive the flame piece to swing around the support rod. The simulated flame lamp is easy to assemble, saves labor, and reduces production costs.

12 Claims, 10 Drawing Sheets

SIMULATED FLAME LAMP

CROSS REFERENCE TO RELATED APPLICATIONS

The present application claims the benefit of Chinese Patent Application No. 202420853268.9 filed on Apr. 23, 2024, the contents of which are incorporated herein by reference in their entirety.

FIELD OF THE INVENTION

The present invention relates to a lighting decoration device, particularly to a simulated flame lamp.

BACKGROUND OF THE INVENTION

Existing candle lamps or simulated flame lamps generally include a lamp head, a flame piece, a light-emitting body, and a driving mechanism. The flame piece is mounted on the lamp head via a mounting wire. The light-emitting body projects light onto the flame piece to create the appearance of a flame. The driving mechanism is used to drive the flame piece to swing, thereby enhancing the simulation effect of the flame piece. Nevertheless, during assembly, workers need to manually thread a steel wire through the lamp head to mount the flame piece. This process is cumbersome and increases the labor intensity for workers, resulting in higher production costs.

SUMMARY OF THE INVENTION

The objective of the present invention is to provide a simulated flame lamp that is easy to assemble, saves labor, and reduces production costs.

To achieve the objective, the present invention provides a simulated flame lamp, including a first lamp head, a second lamp head, a flame piece, and a driving mechanism. An inner side of one of the first lamp head and the second lamp head is provided with a support rod integrally extended inwardly, the first lamp head and the second lamp head are assembled to form a receiving cavity with an upper opening, a middle side of the flame piece is provided with a supported hole, and the support rod is inserted through the supported hole so that the flame piece is supported on a support portion of the support rod, with an upper end of the flame piece extending outside the upper opening; and the driving mechanism is located inside the receiving cavity and configured to drive the flame piece to swing around the support rod.

Compared with the prior art, the first lamp head and the second lamp head are provided in the present invention, with the support rod integrally formed on one of the lamp heads. Therefore, when assembling the simulated flame lamp, the flame piece can be directly inserted onto the support rod, there is no necessary to manually thread a steel wire through the lamp head and then mount the flame piece onto the wire as the traditional step. By this token, the assembly process is simplified and facilitated, thereby saving a significant amount of labor and effectively reducing the production costs.

Preferably, the supported hole has an inner top that is in contact with the support portion, a cross-section of the inner top is gradually narrowed towards the support portion, and/or a cross-section of support portion is gradually narrowed towards the inner top.

Specifically, the cross-section of the inner top or the support portion is in a form of a conical, triangular, or V-shaped structure.

Specifically, a height from an upper surface of two ends of the support rod to a top of the support portion is gradually decreased.

Specifically, an upper end of the flame piece is provided with a flame section in a form of a three-dimensional bubble shell structure. This configuration allows the simulated flame lamp to be viewed from all directions, enhancing the simulation effect.

Specifically, the simulated flame lamp further includes a light-emitting body. An inner cavity is provided inside the flame section, and the light-emitting body is located within the inner cavity. This arrangement enables the flame section to simulate the appearance of burning fire, improving the simulation effect.

Specifically, the simulated flame lamp further includes a circuit board. A middle of the flame piece is provided with a gap, one end of the circuit board is fixed to either the first lamp head or the second lamp head, and the other end of the circuit board extends into the inner cavity of the flame section through the gap. The light-emitting body is mounted on the end of the circuit board, and conductive leads of the light-emitting body are arranged on the circuit board. By setting up the circuit board, on the one hand, it can support the light-emitting body and provide support for the conductive leads of the light-emitting body. On the other hand, it prevents the light-emitting body from swinging with the flame piece, avoiding additional resistance to the swinging of the flame piece caused by the light-emitting body and its conductive leads, thereby effectively improving the stability of the swinging motion of the flame piece and saving energy.

Specifically, one of the first lamp head and the second lamp head is provided with a positioning hole, and one end of the circuit board is inserted and fixed into the positioning hole. This configuration makes the assembly of the circuit board more convenient and faster.

Specifically, the simulated flame lamp further includes a support arm, one end of which is fixed to either the first lamp head or the second lamp head, and the other end of which extends below the flame section. The light-emitting body is located at the other end of the support arm, and the light-emitting body extends into the inner cavity. The conductive leads of the light-emitting body are drawn out along the support arm.

Specifically, the support arm is integrally formed with either the first lamp head or the second lamp head.

Specifically, a latch is provided at the other end of the support arm, and the latch is configured to position the light-emitting body.

Preferably, a lower end of the flame piece is provided with a counterweight section, and the driving mechanism is configured to drive the counterweight section to cause the flame piece to swing. The counterweight section not only ensures that the flame section at the upper part of the flame piece extends outside the cavity but also makes it easier for the driving mechanism to drive the flame piece to swing.

Specifically, the flame section at an upper end of the flame piece is removably connected to the counterweight section. This configuration makes the assembly of the flame piece more convenient and faster.

Specifically, a lower end of the flame section is extended to form a pair of elastic arms, ends of the elastic arms are provided with an engagement hook, the counterweight section is provided with an engagement hole, and the elastic engagement hook is inserted and engaged in the engagement hole. By setting up the elastic arms and the engagement hooks, the assembly of the flame section and the counterweight section is simpler and more convenient, reducing production costs.

Specifically, the flame section at the upper part of the flame piece has a flat blade structure. The simulated flame lamp further includes a light-emitting body, which is located on the inner side of either the first lamp head or the second lamp head, with a light-emitting direction facing the outer side of the flame section. By designing the flame section as a blade structure, the structure of the simulated flame lamp is simplified, the convenience of assembly is improved, and the production costs are reduced.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
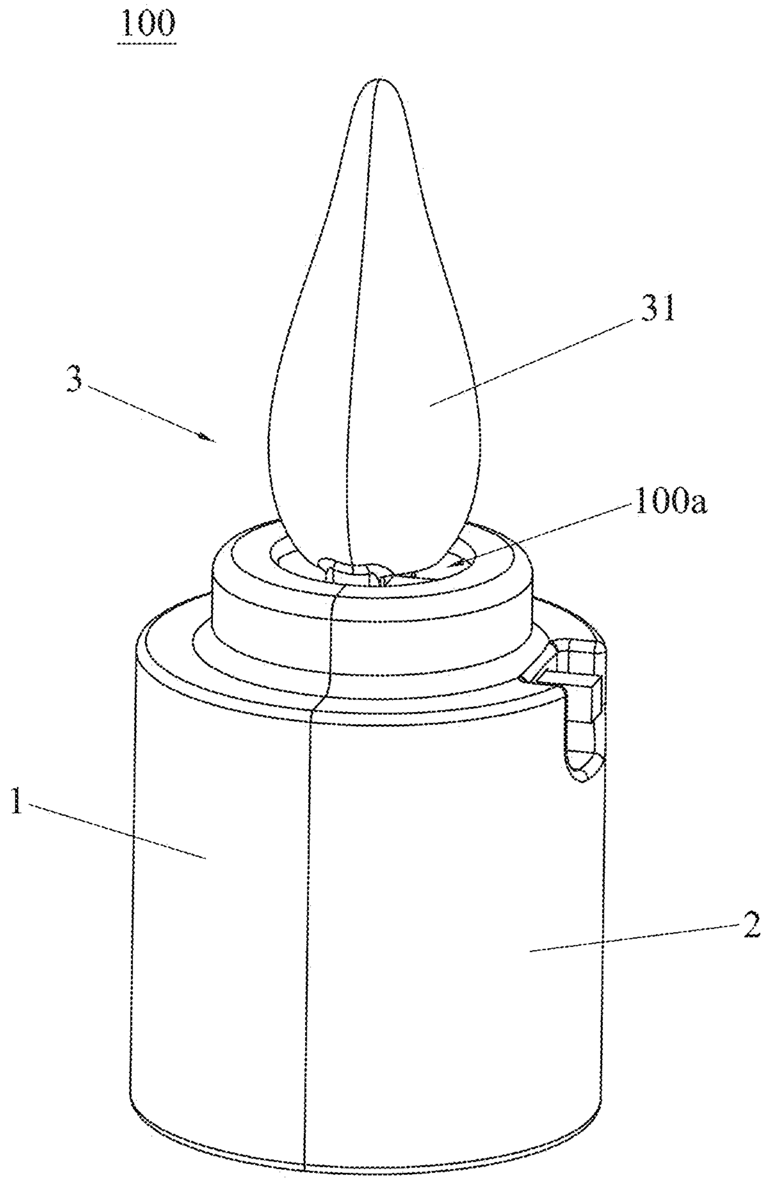
FIG. 1 is a structural diagram of the simulated flame lamp according to a first embodiment of the present invention.

To elaborate on the technical content, structural features, and the effects achieved, the present invention will be described in detail below with reference to the accompanying drawings and preferred embodiments.

As shown in FIGS. 1-5, the simulated flame lamp according to the first embodiment is illustrated. The simulated flame lamp 100 of the present embodiment includes a first lamp head 1, a second lamp head 2, a flame piece 3, and a driving mechanism 4. One of the first lamp head 1 and the second lamp head 2 has a support rod 11 integrally extended inward from its inner side. In this embodiment, the first lamp head 1 has the support rod 11 integrally extended inward from its inner side. The first lamp head 1 and the second lamp head 2 are assembled to form a receiving cavity 100*b* with an upper opening 100*a*. A middle side of the flame piece 3 is provided with a supported hole 3*a*, and the support rod 11 is inserted through the supported hole 3*a* so that the flame piece 3 is mounted on the support portion 111 of the rod 11. The upper end of the flame piece 3 extends outside the opening 100*a*. The driving mechanism 4 is located inside the receiving cavity 100*b* and drives the flame piece 3 to swing around the support rod 11.

Figure 2:
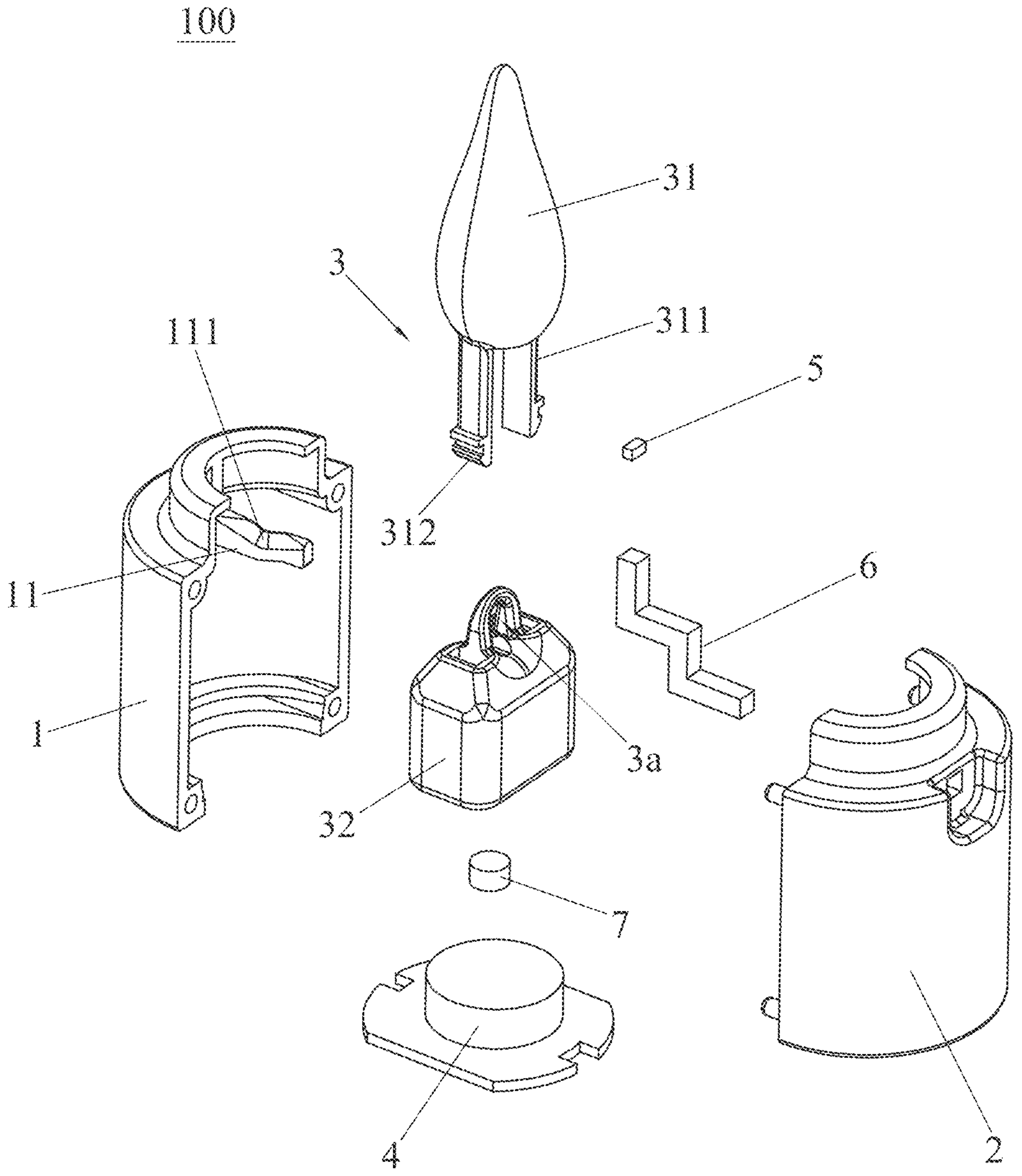
FIG. 2 is an exploded view of the simulated flame lamp according to the first embodiment of the present invention.
Figure 3:
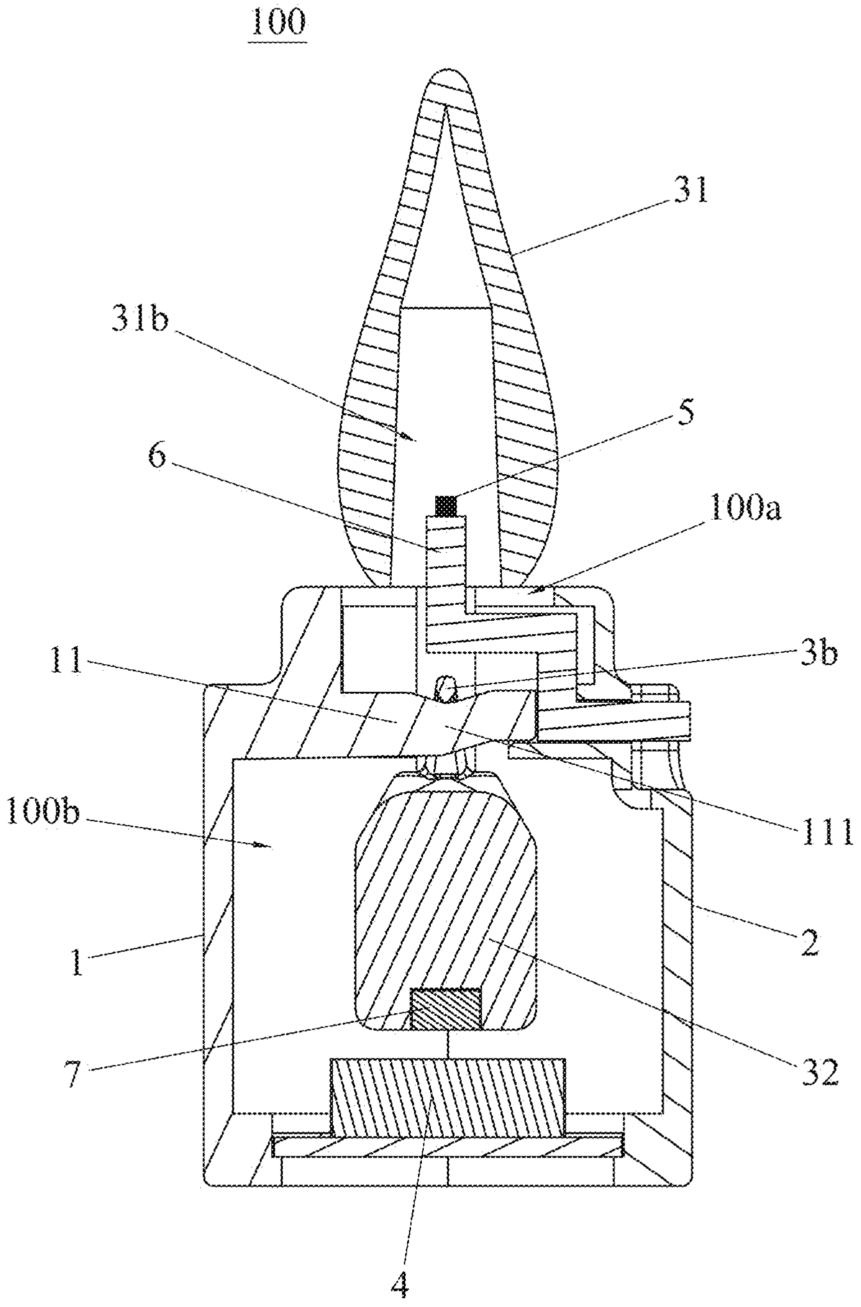
FIG. 3 is a cross-sectional view of the simulated flame lamp according to the first embodiment of the present invention.
Figure 4:
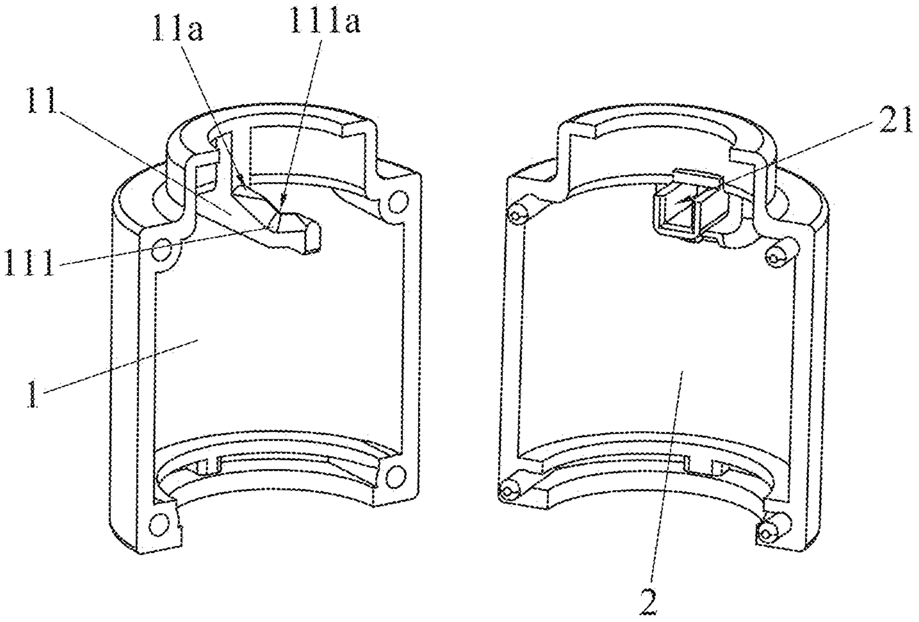
FIG. 4 is a structural diagram of the first lamp head and the second lamp head of the simulated flame lamp according to the first embodiment of the present invention.

Referring to FIGS. 2, 3, and 4, the support portion 111 is located in the middle of the support rod 11. The support portion 111 is in contact with the supported hole 3*a*, and the supported hole has an inner top 3*b* that is in contact with the support portion 111. Preferably, a cross-section of the inner top 3*b* is gradually narrowed towards the support portion 111, and/or a cross-section of support portion 111 is gradually narrowed towards the inner top 3*b*. In the embodiment as shown in FIG. 3, the cross-section of the inner top 3*b* is gradually narrowed towards the support portion 111. This configuration minimizes the contact area between the support portion 111 and the flame piece 3, thereby reducing the frictional resistance during the swinging of the flame piece 3, decreasing the frequency with which the driving mechanism 4 needs to drive the flame piece 3, and saving energy. In this embodiment, both the cross-section of the support portion 111 and the inner top 3*b* of the supported hole 3*a* are in the form of a conical, triangular, or V-shaped structure, which allows for line or point contact between the support portion 111 and the flame piece 3, thereby significantly reducing the frictional resistance. The top 111*a* of the support portion 111 is at a lower horizontal level than the upper surface 11*a* of the support rod 11. Specifically, the height from the upper surface 11*a* of the two ends of the support rod 11 to the top 111*a* of the support portion 111 is gradually decreased, which helps to securely position the flame piece 3 on the support portion 111.

As shown in FIGS. 2 and 3, the lower end of the flame piece 3 has a counterweight section 32, which is driven by the driving mechanism 4 to cause the flame piece 3 to swing. The counterweight section 32 not only ensures that the flame section 31 at the upper end of the flame piece 3 extends outside the receiving cavity 100*b* but also makes it easier for the driving mechanism 4 to drive the flame piece 3 to swing. In this embodiment, the flame section 31 at the upper end of the flame piece 3 has a three-dimensional bubble shell structure. This configuration allows the simulated flame lamp 100 to be viewed from all directions, enhancing the simulation effect. The flame section 31 is removably connected to the counterweight section 32, which makes the assembly of the flame piece 3 more convenient and faster. Specifically, the lower end of the flame section 31 is extended to form a pair of elastic arms 311, the ends of which are provided with engagement hooks 312. The counterweight section 32 is provided with engagement holes 321, and the elastic engagement hooks 312 are inserted and engaged in these holes 321. The elastic arms 311 and the engagement hooks 312 simplify the assembly process between the flame section 31 and the counterweight section 32, thereby reducing production costs.

Figure 5:
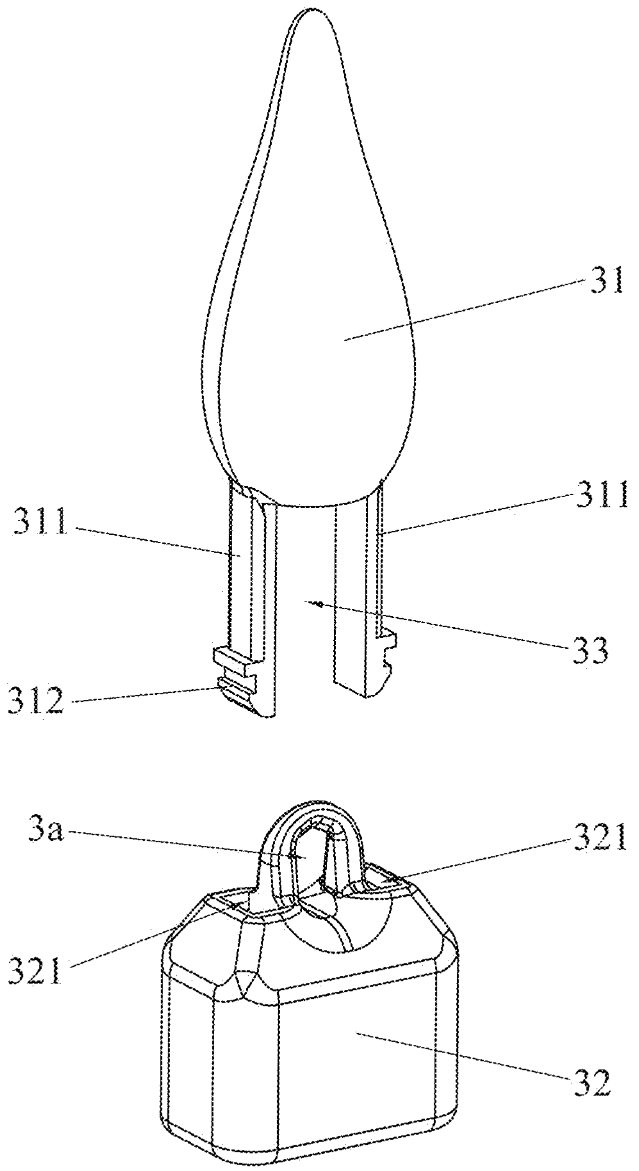
FIG. 5 is a structural diagram of the flame piece of the simulated flame lamp of according to the first embodiment of the present invention.
Figure 6:
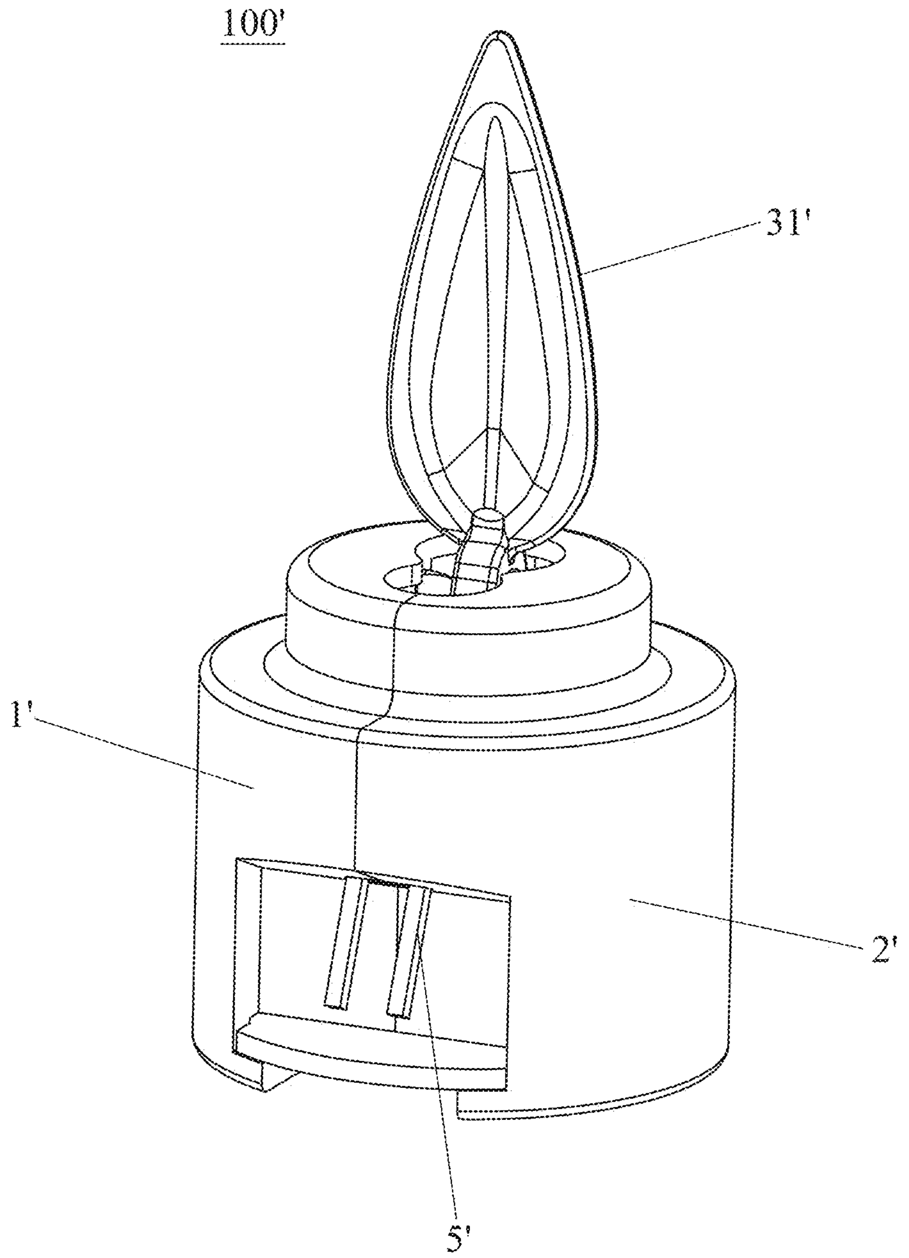
FIG. 6 is a structural diagram of the simulated flame lamp according to a second embodiment of the present invention.
Figure 7:
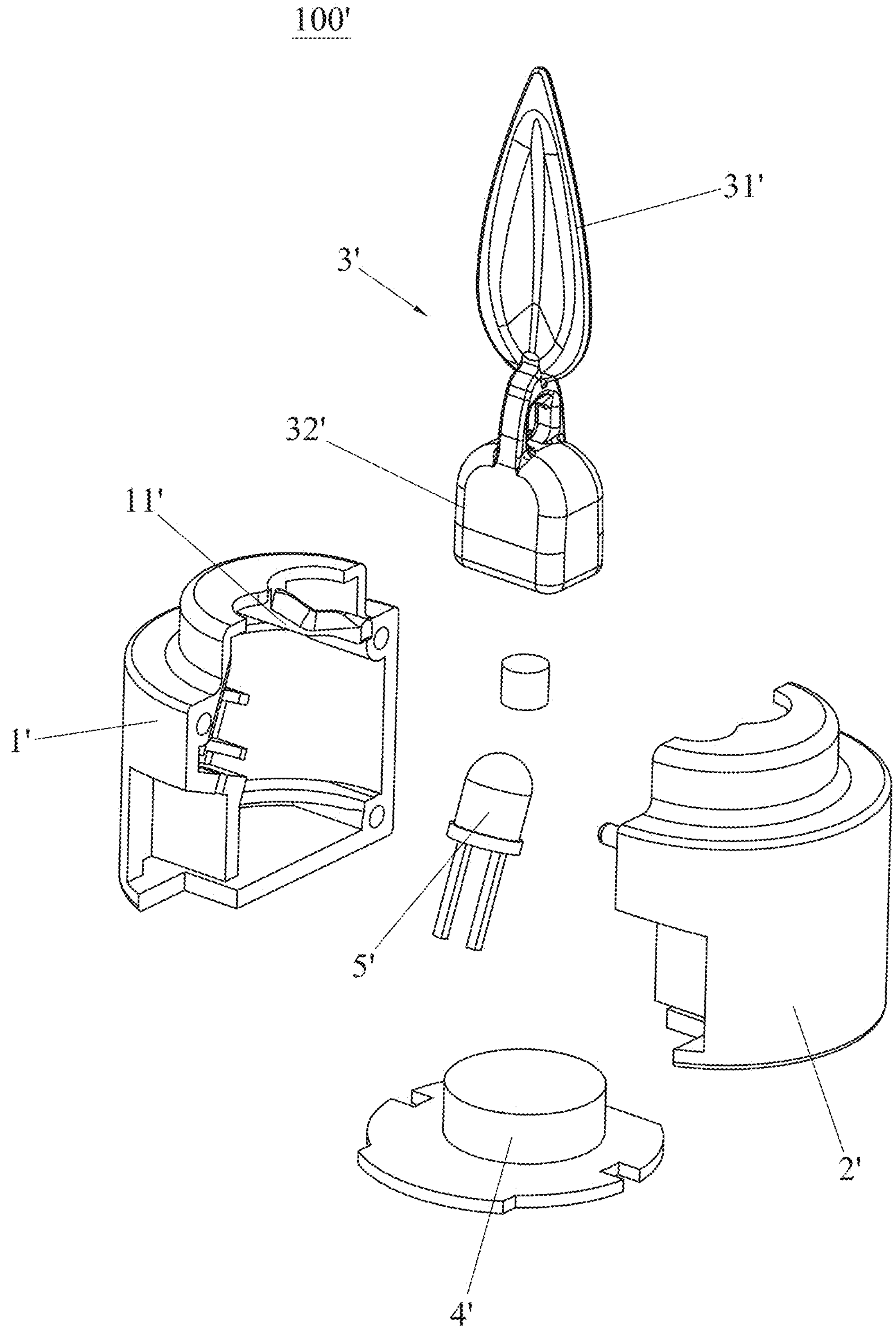
FIG. 7 is an exploded view of the simulated flame lamp according to a second embodiment of the present invention.
Figure 8:
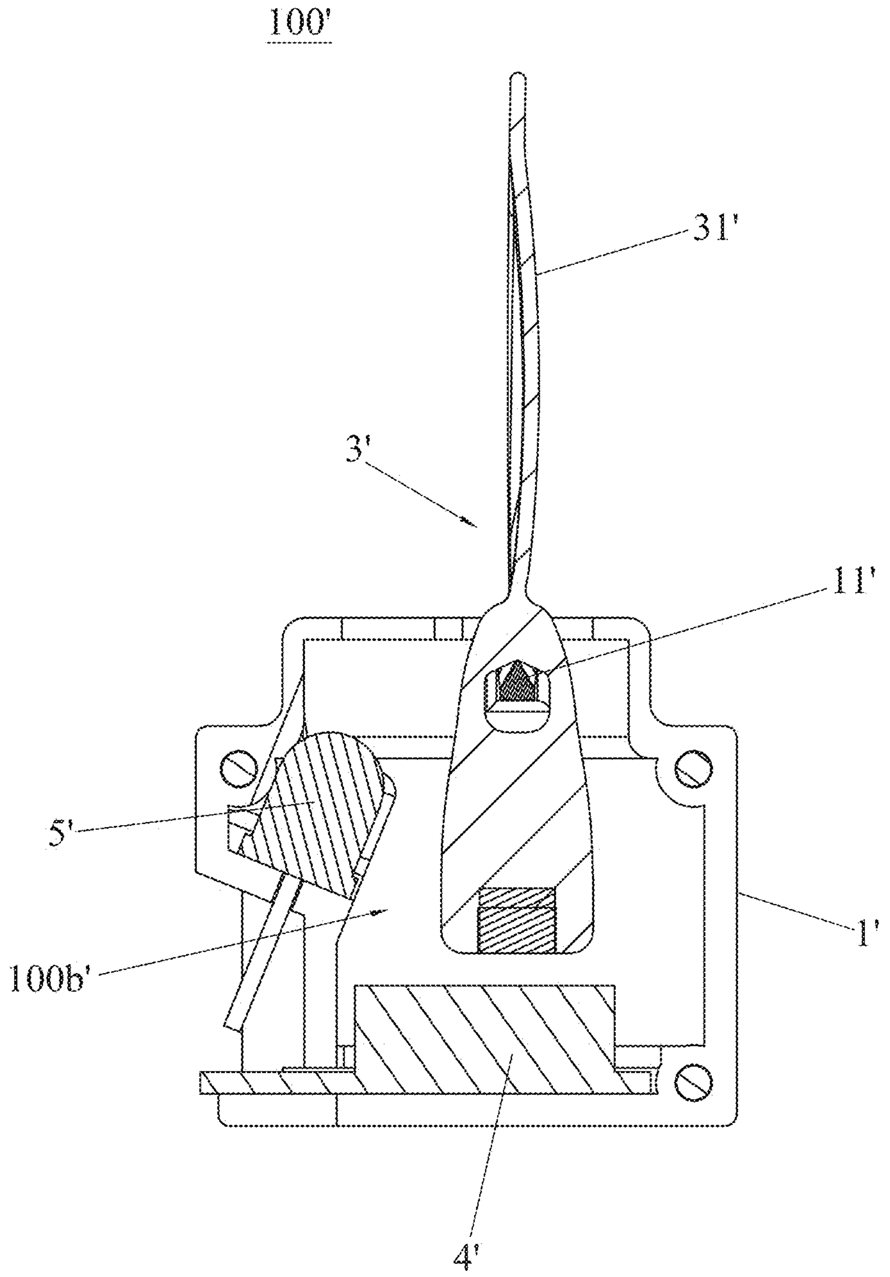
FIG. 8 is a cross-sectional view of the simulated flame lamp according to a second embodiment of the present invention.
Figure 9:
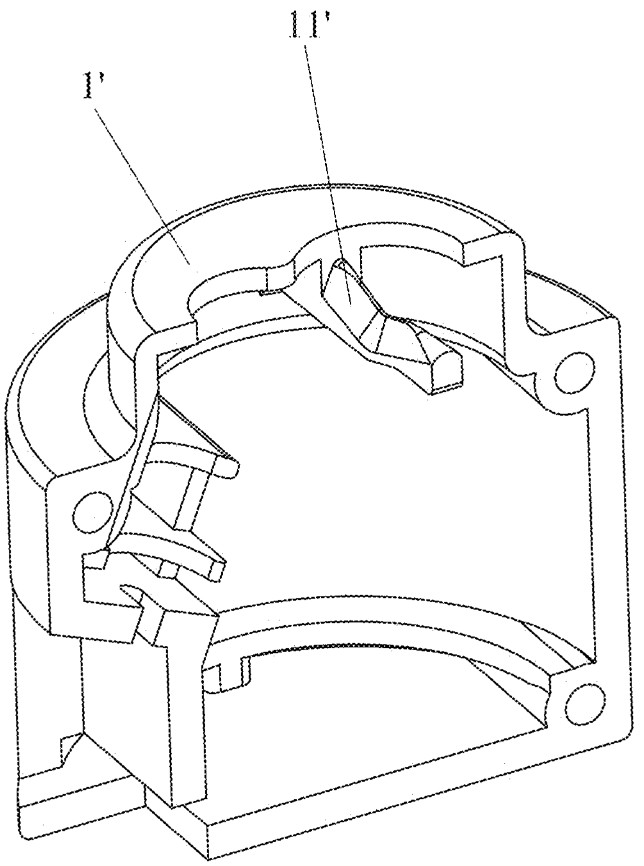
FIG. 9 is a structural diagram of the first lamp head of the simulated flame lamp according to a second embodiment of the present invention.

As shown in FIGS. 2, 3, and 5, the simulated flame lamp 100 further includes a light-emitting body 5. The flame section 31 has an inner cavity 31*b*, and the light-emitting body 5 is placed within this inner cavity 31*b*. This arrangement enables the flame section 31 to simulate the appearance of fire, improving the realism of the simulation. The simulated flame lamp 100 further includes a circuit board 6. The flame piece 3 has a gap 33 in the middle that is open on both sides. One of the first lamp head 1 and the second lamp head 2 is provided with a positioning hole 21. In this embodiment, the positioning hole 21 is provided on the second lamp head 2, and one end of the circuit board 6 is inserted and fixed into this positioning hole 21. This arrangement makes the assembly of the circuit board 6 more convenient and faster. The circuit board 6 has a stepped structure formed by three consecutive bends. The other end of the circuit board 6 extends into the inner cavity 31*b* of the flame section 31 through the gap 33. When the flame piece 3 swings, the circuit board 6 located within the gap 33 avoids interference with the flame piece 3. The light-emitting body 5 is mounted on the end of the circuit board 6, and the conductive leads of the light-emitting body 5 are placed on the circuit board 6. The circuit board 6 serves to support the light-emitting body 5 and the conductive leads thereon. It also prevents the light-emitting body 5 from swinging with the flame piece 3, avoiding additional resistance to the swinging of the flame section 31 caused by the light-emitting body 5 and its conductive leads. This effectively improves the stability of the swinging motion of the flame piece and saves energy.

Referring to FIGS. 2 and 3, the driving mechanism 4 is an electromagnetic coil, and a piece of iron or magnet 7 is placed at the lower end of the flame piece 3, directly above the electromagnetic coil. By utilizing the principle that the electromagnetic coil generates a magnetic field when electrified to drive the movement of the iron or magnet 7, not only the flame piece 3 can be driven, but also the driving mechanism 4 can be kept in non-contact/non-collision with the flame piece 3. This effectively eliminates the noise generated by the driving mechanism 4, making the product more comfortable for users.

Compared with the existing technology, the first lamp head 1 and the second lamp head 2 are provided in the present invention, with the support rod 11 integrally formed on one of the lamp heads 1 and 2. Therefore, when assembling the simulated flame lamp 100, the flame piece 3 can be directly inserted onto the support rod 11, there is no necessary to manually thread a steel wire through the lamp head and then mount the flame piece 3 onto the wire as the traditional step. By this token, the assembly process is simplified and facilitated, thereby saving a significant amount of labor and effectively reducing the production costs.

As shown in FIGS. 6 to 9, the simulated flame lamp 100' according to the second embodiment of the present invention is illustrated. The structure of the first lamp head 1' and the second lamp head 2' in this embodiment is the same as that of the first lamp head 1 and the second lamp head 2 in the first embodiment. The structure of the support rod 11' and the driving mechanism 4' in this embodiment is also the same as that of the support rod 11 and the driving mechanism 4 in the first embodiment. The difference lies in the structure of the flame piece 3. In this embodiment, the flame section 31' of the flame piece 3' is integrally formed with the counterweight section 32', that is, the flame section 31' and the counterweight section 32' are formed in a one-piece structure, and the flame section 31' has a flat blade structure. By designing the flame section 31' as a blade structure, the structure of the simulated flame lamp 100' is simplified, the convenience of assembly is improved, and the production cost is reduced. The simulated flame lamp 100' of this embodiment further includes a light-emitting body 5' and a circuit board (not shown in the figure). The light-emitting body 5' is located on the inner side of either the first lamp head 1' or the second lamp head 2', with the light-emitting direction facing the outer side of the flame section 31'. The circuit board is located within the receiving cavity 100*b*' formed by the first lamp head 1' and the second lamp head 2' and is electrically connected to the light-emitting body 5'. The technical effects of the simulated flame lamp 100' in this second embodiment are the same as those in the first embodiment, and thus will not be repeated here.

Figure 10:
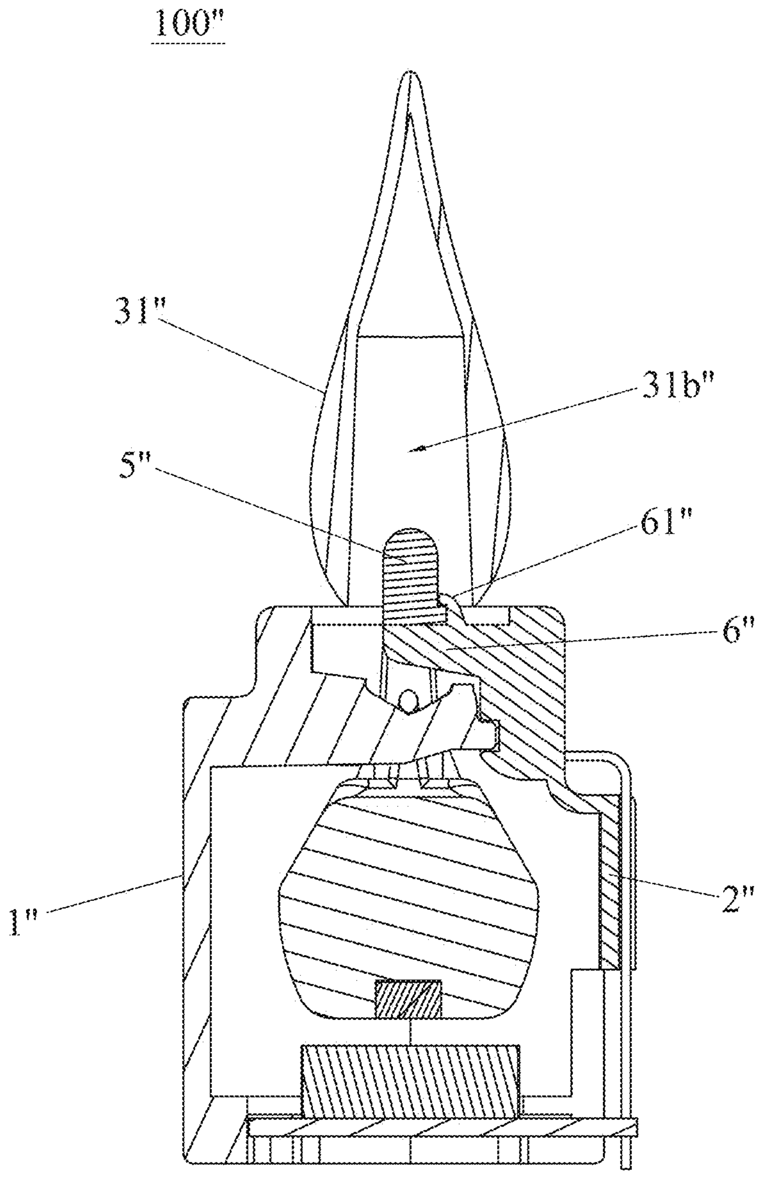
FIG. 10 is a structural diagram of the simulated flame lamp according to a third embodiment of the present invention.

As shown in FIG. 10, the simulated flame lamp 100" according to the third embodiment of the present invention is illustrated. The simulated flame lamp 100" of this embodiment is basically the same in structure as the simulated flame lamp 100 of the first embodiment, with the difference lying in the structure of the lamp board and one of the lamp heads. The simulated flame lamp 100" of this embodiment eliminates the lamp board 6 of the first embodiment 1. Instead, a support arm 6" is provided on either the first lamp head 1" or the second lamp head 2". The support arm 6" described in this embodiment is integrally formed with the second lamp head 2", that is support arm 6" and the second lamp head 2" are formed in a one-piece structure. One end of the support arm 6" is fixed to the second lamp head 2", and the other end of the support arm 6" extends below the flame section 31". The light-emitting body 5" is located at the end of the other end of the support arm 6", and the light-emitting body 5" extends into the inner cavity 31*b*". The conductive leads of the light-emitting body 5" are drawn out along the support arm 6". A latch 61" is provided at the end of the other end of the support arm 6", for positioning the light-emitting body 5". The technical effects of the simulated flame lamp 100" of this embodiment are the same as those in the first embodiment, and thus will not be repeated here.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A simulated flame lamp, comprising a first lamp head, a second lamp head, a flame piece, and a driving mechanism, wherein an inner side of one of the first lamp head and the second lamp head is provided with a support rod integrally extended inwardly, the first lamp head and the second lamp head are assembled to form a receiving cavity with an upper opening, a middle side of the flame piece is provided with a supported hole, and the support rod is inserted through the supported hole so that the flame piece is supported on a support portion of the support rod, with an upper end of the flame piece extending outside the upper opening; and the driving mechanism is located inside the receiving cavity and configured to drive the flame piece to swing around the support rod;

wherein an upper end of the flame piece is provided with a flame section in a form of a three-dimensional bubble shell structure;

wherein a light-emitting body is further included, an inner cavity is provided inside the flame section, and the light-emitting body is located within the inner cavity.

2. The simulated flame lamp according to claim 1, wherein the supported hole has an inner top that is in contact with the support portion, a cross-section of the inner top is gradually narrowed towards the support portion, and/or a cross-section of support portion is gradually narrowed towards the inner top.

3. The simulated flame lamp according to claim 2, wherein the cross-section of the inner top or the support portion is in a form of a conical, triangular, or V-shaped structure.

4. The simulated flame lamp according to claim 1, wherein a height from an upper surface of two ends of the support rod to a top of the support portion is gradually decreased.

5. The simulated flame lamp according to claim 1, further comprising a circuit board, wherein a middle of the flame piece is provided with a gap, one end of the circuit board is fixed to either the first lamp head or the second lamp head, and the other end of the circuit board extends into the inner cavity of the flame section through the gap; the light-emitting body is mounted on the end of the circuit board, and conductive leads of the light-emitting body are arranged on the circuit board.

6. The simulated flame lamp according to claim 5, wherein one of the first lamp head and the second lamp head is provided with a positioning hole, and one end of the circuit board is inserted and fixed into the positioning hole.

7. The simulated flame lamp according to claim 1, further comprising a support arm, wherein one end of which is fixed to either the first lamp head or the second lamp head, and the other end of which extends below the flame section; the light-emitting body is located at the other end of the support arm, and the light-emitting body extends into the inner cavity; and the conductive leads of the light-emitting body are drawn out along the support arm.

8. The simulated flame lamp according to claim 7, wherein the support arm is integrally formed with either the first lamp head or the second lamp head.

9. The simulated flame lamp according to claim 7, wherein a latch is provided at the other end of the support arm, and the latch is configured to position the light-emitting body.

10. The simulated flame lamp according to claim 1, wherein a lower end of the flame piece is provided with a counterweight section, and the driving mechanism is configured to drive the counterweight section to cause the flame piece to swing.

11. The simulated flame lamp according to claim 10, wherein the flame section is removably connected to the counterweight section.

12. The simulated flame lamp according to claim 11, wherein a lower end of the flame section is extended to form a pair of elastic arms, ends of the elastic arms are provided with an engagement hook, the counterweight section is provided with an engagement hole, and the elastic engagement hook is inserted and engaged in the engagement hole.

* * * * *